US006470331B1

United States Patent
Chen et al.

(10) Patent No.: US 6,470,331 B1
(45) Date of Patent: Oct. 22, 2002

(54) VERY LARGE TABLE REDUCTION IN PARALLEL PROCESSING DATABASE SYSTEMS

(75) Inventors: James Chen, Torrance; Chi Kim Hoang, Palo Alto; Mark A. Hodgens, San Diego; Fred S. Kaufmann, Irvine; Rolf G. E. Stegelmann, Valencia, all of CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/454,730

(22) Filed: Dec. 4, 1999

(51) Int. Cl.[7] ............................................. G06F 17/30
(52) U.S. Cl. ............................................. 707/2; 707/10
(58) Field of Search ....................................... 707/2, 10

(56) References Cited

U.S. PATENT DOCUMENTS

| | | | |
|---|---|---|---|
| 5,325,526 A | * 6/1994 | Cameron et al. | 709/102 |
| 5,797,000 A | * 8/1998 | Bhattacharya et al. | 707/2 |
| 5,819,083 A | * 10/1998 | Chen et al. | 370/235 |
| 5,832,475 A | * 11/1998 | Agrawal et al. | 707/1 |
| 5,857,180 A | * 1/1999 | Hallmark et al. | 707/2 |
| 5,864,842 A | * 1/1999 | Pederson et al. | 707/2 |
| 5,970,495 A | * 10/1999 | Baru et al. | 707/10 |
| 6,003,036 A | * 12/1999 | Martin | 707/102 |
| 6,081,801 A | * 6/2000 | Cochrane et al. | 707/201 |
| 6,112,198 A | * 8/2000 | Lohman et al. | 707/3 |
| 6,226,639 B1 | * 5/2001 | Lindsay et al. | 707/1 |
| 6,263,331 B1 | * 7/2001 | Liu et al. | 707/3 |
| 6,349,310 B1 | * 2/2002 | Klein et al. | 707/100 |
| 6,397,227 B1 | * 5/2002 | Klein et al. | 707/200 |
| 6,405,198 B1 | * 6/2002 | Bitar et al. | 707/200 |

* cited by examiner

Primary Examiner—Wayne Amsbury
(74) Attorney, Agent, or Firm—Gates & Cooper

(57) ABSTRACT

A method, apparatus, and article of manufacture for accessing a subject table in a computer system. The subject table is partitioned across a plurality of processing units of the computer system. A user query or other request to access the subject table is split into a plurality of step messages, wherein each of the step messages is assigned to one of the processing units managing one or more of the partitions of the subject table. A plurality of actions are identified for each of the step messages, and one or more necessary records for these actions are retrieved from the partition of the subject table and stored into a corresponding partition of a spool table. The necessary records are selected in such a manner that none of the actions involved in the request need to access the partition of the subject table. The actions from the step message are then performed against the partitions of the spool table rather than the partitions of the subject table. An optimizer function uses information from the spool table to generate more efficient execution plans for the step message and its associated actions.

12 Claims, 3 Drawing Sheets

VERY LARGE TABLE REDUCTION IN PARALLEL PROCESSING DATABASE SYSTEMS

CROSS-REFERENCE TO RELATED APPLICATION

This application is related to co-pending and commonly-assigned Application Ser. No. 09/459,729, filed on same date herewith, by James Chen, Chi Kim Hoang, Mark Hodgens, Fred Kaufmann and Rolf Stegelmann, entitled "PARALLEL OPTIMIZED TRIGGERS IN PARALLEL PROCESSING DATABASE SYSTEMS", now U.S. Pat. No. 6,374,236, which application is incorporated by reference herein.

BACKGROUND OF THE INVENTION

1. Field of the Invention

This invention relates in general to database management systems performed by computers, and in particular, to reducing very large tables to optimize the execution of a pluality of actions in a parallel processing database system.

2. Description of Related Art

Relational DataBase Management Systems (RDBMS) store data into tables. A table in a relational database is two dimensional, comprising rows and columns. Each column has a name, typically describing the type of data held in that column. As new data is added, more rows are inserted into the table. As data is changed, rows are updated. A user query selects some rows of the table by specifying clauses that qualify the rows to be retrieved based on the values in one or more of the columns. These changes and queries are referred to as actions against the table.

With the advent of data warehouses, it is not uncommon for relational databases to store very large tables. Such tables may range from megabytes to gigabytes, terabytes, or more. As a result, the RDBMS may have to examine thousands, millions, billions, or more, records to satisfy each action. In the prior art, the necessary records would be retrieved from the table once per action. Often, however, it may be possible to apply one or more actions to reduce the number of records examined before applying others of the actions. The advantage, of course, is that the table size and record counts for the subsequent actions could be greatly reduced. This would result in faster execution using fewer resources, thereby improving response time and data throughput.

While there have been various techniques developed for optimizing the performance of RDBMS, there is a need in the art for techniques that optimize the performance of user queries by reducing the size of very large tables.

SUMMARY OF THE INVENTION

The present invention discloses a method, apparatus, and article of manufacture for accessing a subject table in a computer system The subject table is partitioned across a plurality of processing units of the computer system. A user query or other request to access the subject table is split into a plurality of step messages, wherein each of the step messages is assigned to one of the processing units managing one or more of the partitions of the subject table. One or more actions are identified for each of the step messages, and one or more necessary records for these actions are retrieved from the partition of the subject table and stored into a corresponding partition of a spool table. The necessary records are selected in such a manner such that only one of the actions involved in the request need to access the partition of the subject table. The remaining actions are then performed against the partitions of the spool table rather than the partitions of the subject table. An optimizer function uses information from the spool table to generate more efficient execution plans for the step message and its associated actions.

An object of the present invention is to optimize the database access on parallel processing computer systems. Another object of the present invention is to improve the performance of database partitions managed by a parallel processing computer systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Environment

Figure 1:
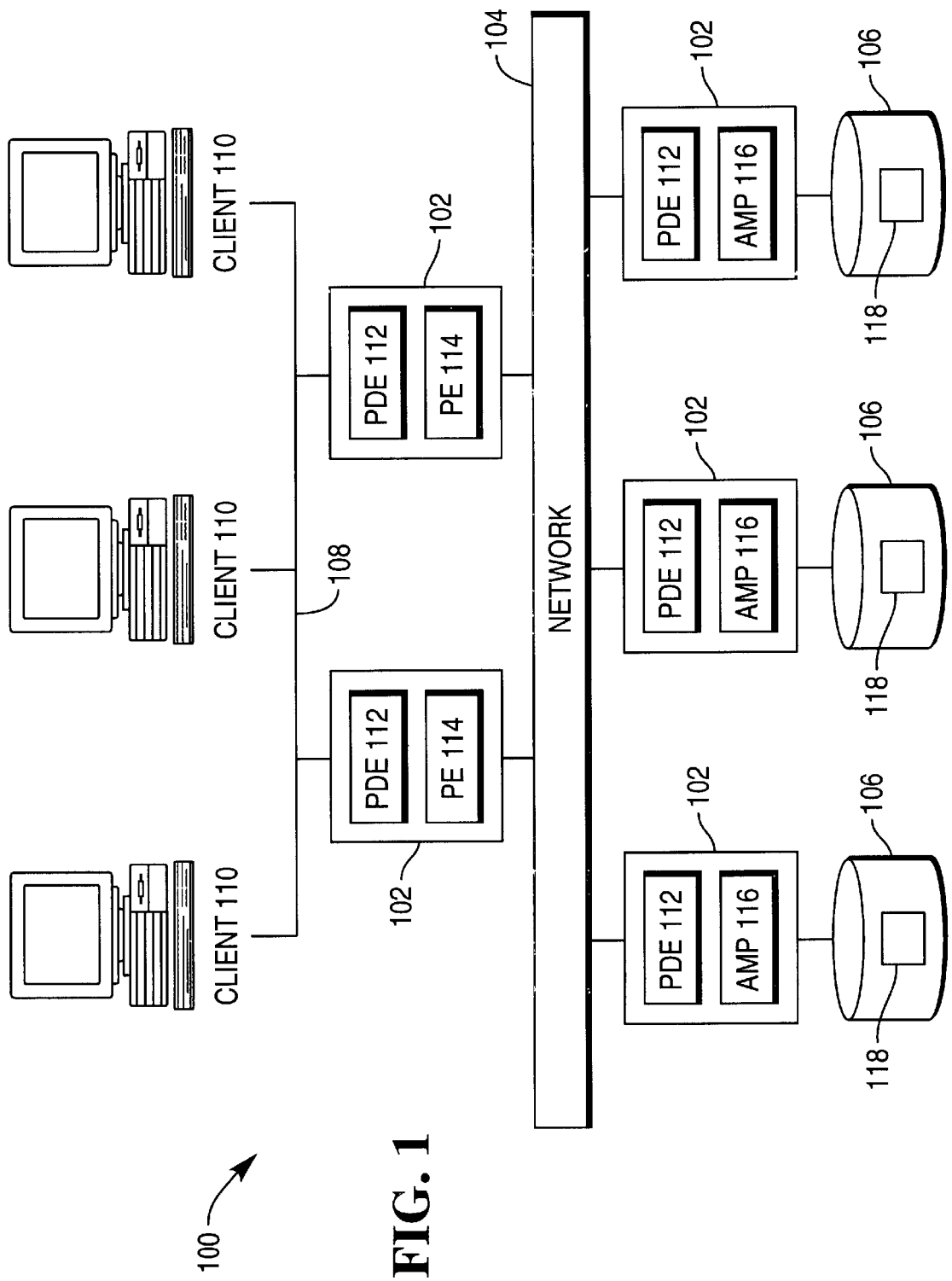
FIG. 1 illustrates an exemplary software and hardware environment that could be used with the present invention.

FIG. 1 illustrates an exemplary hardware and software environment that could be used with the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by Relational DataBase Management System (RDBMS) software executed by the system 100.

In the preferred embodiment of the present invention, the RDBMS software comprises the Teradata® product offered by NCR Corporation, and includes one or more Parallel Database Extensions (PDEs) 112, Parsing Engines (PEs) 114, and Access Module Processors (AMPs) 116. These components of the RDBMS software perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS software across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism The vproc concept results in better system 100 availability without undue programming overhead. The vprocs also provide a degree of location transparency, in that vprocs with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to an AMP 116. In the preferred embodiment, data partitioning and repartitioning may be performed, in order to enhance parallel processing across multiple AMPs 116. For example, the data maybe hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Execution of SQL Queries

Figure 2:
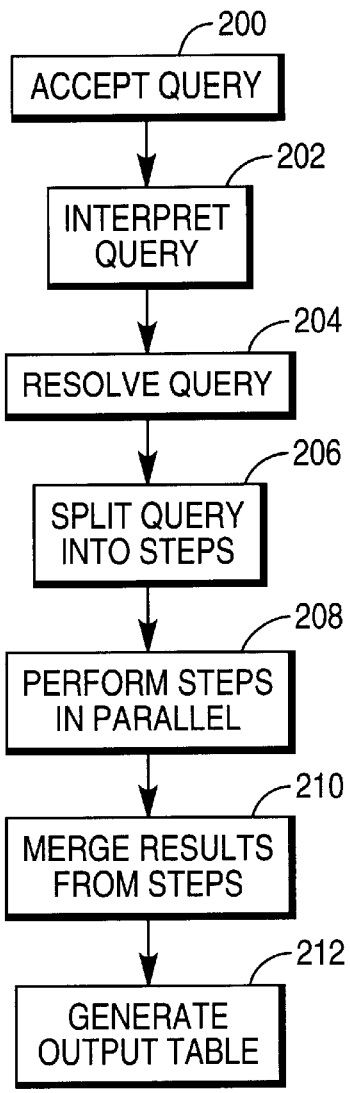
FIG. 2 is a flow chart illustrating the steps necessary for the interpretation and execution of queries or other user interactions, either in a batch environment or in an interactive environment, according to the preferred embodiment of the present invention.

FIG. 2 is a flow chart illustrating the steps necessary for the interpretation and execution of queries or other user interactions, either in a batch environment or in an interactive environment, according to the preferred embodiment of the present invention.

Block 200 represents a query being accepted by the PE 114.

Block 202 represents the query being transformed by an interpreter function of the PE 114.

Block 204 represents the PE 114 resolving symbolic names in the query using a data dictionary that contains information about all the databases 118 and tables in the system 100.

Block 206 represents the PE 114 splitting the query into one or more "step messages", wherein each step message is assigned to an AMP 116 that manages the desired records. As mentioned above, the rows of the tables in the database 118 are partitioned or otherwise distributed among multiple AMPs 116, so that multiple AMPs 116 can work at the same time on the data of a given table. If a request is for data in a single row, the PE 114 transmits the steps to the AMP 116 in which the data resides. If the request is for multiple rows, then the steps are forwarded to all participating AMPs 116. Since the tables in the database 118 maybe partitioned or distributed across the DSUs 16 of the AMPs 116, the workload of performing the SQL query can be balanced among AMPs 116 and DSUs 16.

Block 206 also represents the PE 114 sending the step messages to their assigned AMPs 116.

Block 208 represents the AMPs 116 performing the required data manipulation associated with the step messages received from the PE 114, and then transmitting appropriate responses back to the PE 114.

Block 210 represents the PE 114 then merging the responses that come from the AMPs 116.

Block 212 represents the output or result table being generated.

Operation of the Preferred Embodiment

Figure 3:
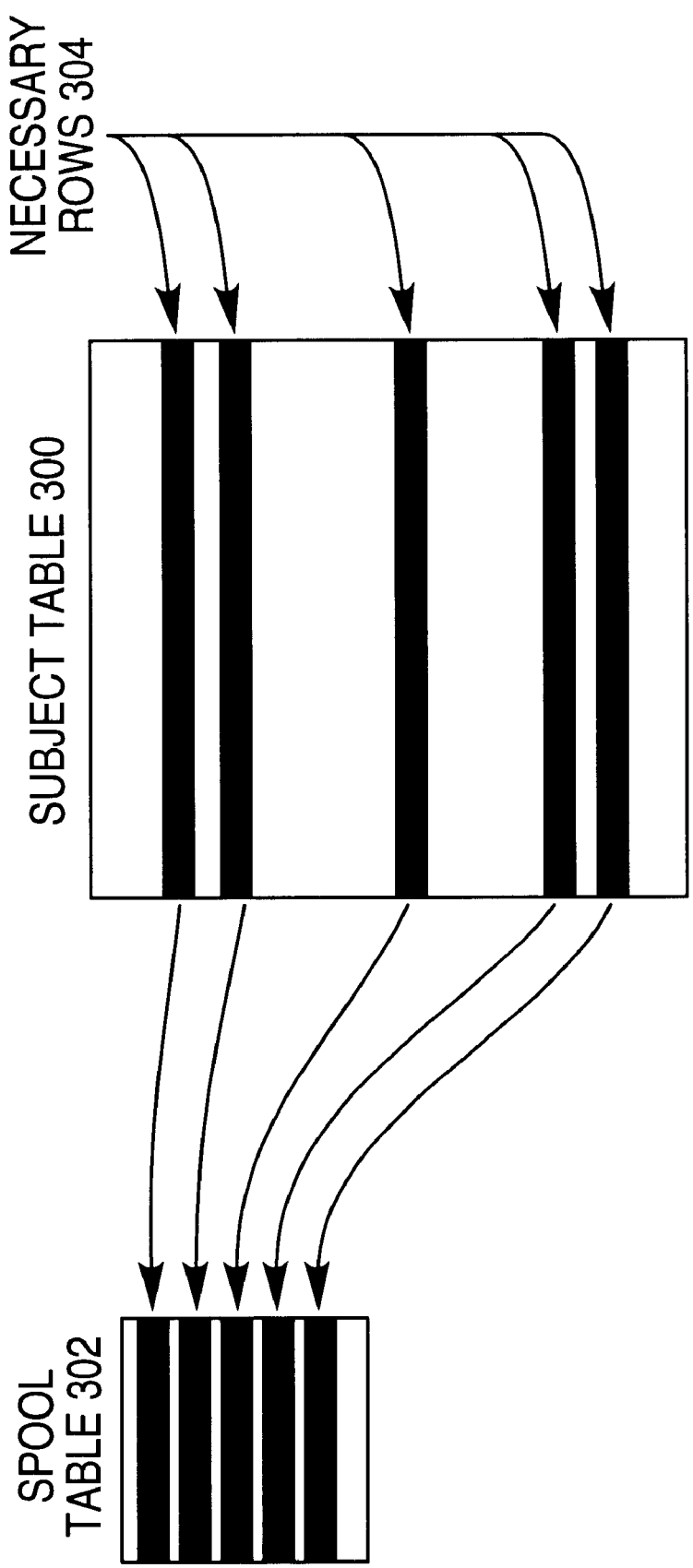
FIG. 3 is a block diagram that illustrates the data structures according to the preferred embodiment of the present invention.

FIG. 3 is a block diagram that illustrates the data structures according to the preferred embodiment of the present invention. As mentioned above, the rows of a table 300 in the database 118 are partitioned or otherwise distributed among multiple AMPs 116, so that multiple AMPs 116 can work at the same time on the data of a given table 300. This Figure shows only a single partition of the subject table 300, wherein this partition stores only a subset of the entire set of rows available from the base table.

According to the preferred embodiment, a user query is interpreted by the PE 112 and split into one or more "step messages", wherein each step message is assigned to an AMP 116 and associated partition, and each AMP 116 may receive multiple step messages. Further, each step message may result in the AMP 116 performing one or more actions against the subject table.

In this example, one or more of the actions are performed against the subject table 300 to generate a smaller subset of records stored in a spool table 302. The records retrieved from the subject table 300 and stored in the spool table are known as necessary rows 304. These necessary rows 304 are selected in such a manner that no other actions involved in the user query need to access the subject table 300 again.

Like the subject table 300, the spool table 300 is partitioned or otherwise distributed among multiple AMPs 116, so that multiple AMPs 116 can work at the same time on the records of the spool table 302. Thus, FIG. 3 shows only a single partition of the spool table 302 that is stored in the database 118. Since the spool tables 302 in the database 118 are partitioned or distributed across multiple AMPs 116, the workload of performing the user query can be balanced among AMPs 116.

The advantage of using the spool table 304, instead of using the entire subject table 300, for every action, is that only the necessary rows 304 required to satisfy the actions are accessed. Thus, while the number of records in each partition of the subject table 300 may be quite large, the number of rows in each partition of the spool table may be much less. As a result, the AMP 116 has faster access to the necessary rows 304 for scans, joins, index retrievals, aggregation, and other operations of the user query. Moreover, an optimizer function performed either by the PE 114 or the AMP 116 can use smaller demographics (e.g., rows, cardinality, etc.) from the spool table 302 to generate more efficient execution plans for the user query and its actions, wherein the execution plans use the spool table 302 and/or other tables accessed in tandem with the spool table 302. This results in faster execution of user queries using fewer resources, thus improving response time and throughput.

Logic of the Preferred Embodiment

Figure 4:
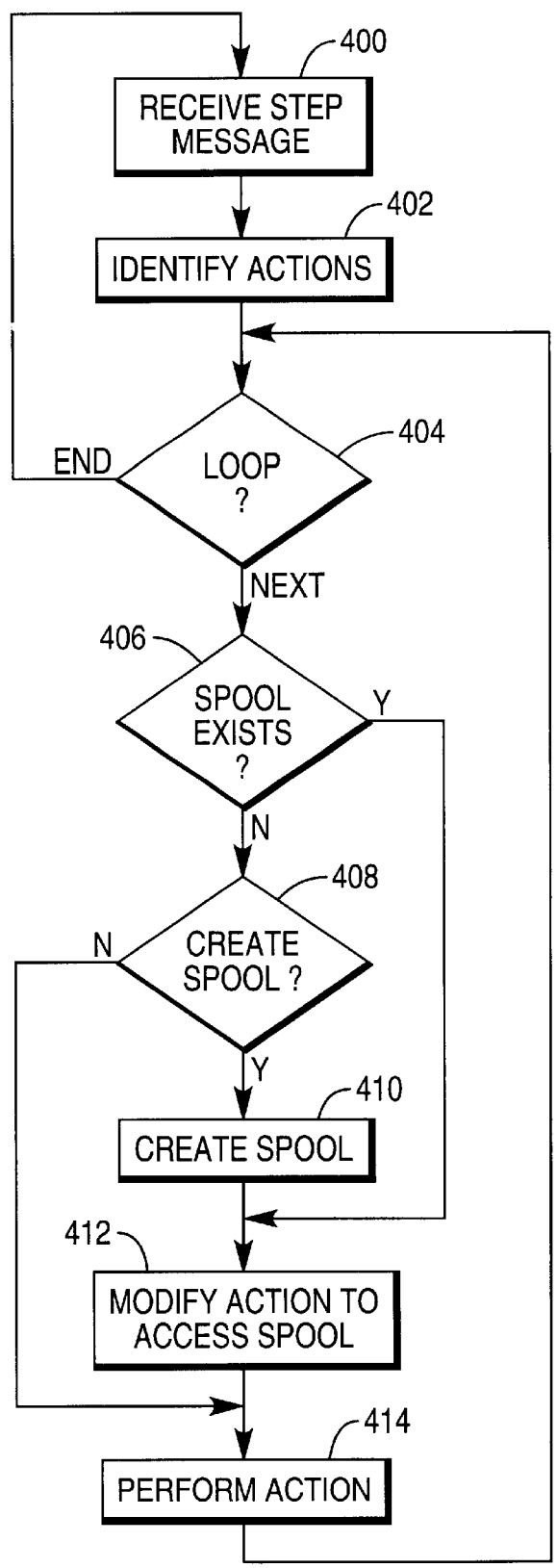
FIG. 4 is a flowchart that illustrates the logic performed according to the preferred embodiment of the present invention.

FIG. 4 is a flowchart that illustrates the logic performed according to the preferred embodiment of the present invention. In the preferred embodiment, this logic is performed at Block 208 of FIG. 2.

Block 400 represents an AMP 116 receiving one or more step messages from the PE 114.

Block 402 represents the AMP 116 identifying one or more actions performed for each of the step messages.

Block 404 is a decision block that represents the AMP 116 looping through the actions. For each action, control transfers to Block 406. Upon completion of the loop, control transfers back to Block 400.

Block 406 is a decision block that represents the AMP 116 determining whether a spool table 302 already exists that can be used by the action. If so, control transfers to Block 412; otherwise, control transfers to Block 408.

Block 408 is a decision block that represents the AMP 116 determining whether a spool table 302 should be created for the action (and subsequent actions). If so, control transfers to Block 410; otherwise, control transfers to Block 414.

Block 410 represents the AMP 116 generating the spool table 302 by analyzing the action (and subsequent actions) to identify the necessary rows 304, retrieving the necessary rows 304 from the subject table 300, and then storing the necessary rows 304 into the spool table 302.

Block 412 represents the AMP 116 modifying the action to access the spool table 302 rather than the subject table 300.

Block 414 represents the AMP 116 performing the action, either on the subject table 300 or the spool table 302. Thereafter, control returns to Block 400.

Conclusion

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any DBMS or other program that performs similar functions.

In another alternative embodiment, the partitions of the table need not be spread across separate data storage devices. Instead, the partitions could be stored on one or a few data storage devices simply to minimize the amount of temporary data storage required at each of the steps of the method.

In yet another alternative embodiment, the steps or logic could be performed by more or fewer processors, rather than the designated and other processors as described above. For example, the steps could be performed simultaneously on a single processor using a multi-tasking operating environment.

In summary, the present invention discloses a method, apparatus, and article of manufacture for accessing a subject table in a computer system. The subject table is partitioned across a plurality of processing units of the computer system. A user query or other request to access the subject table is split into a plurality of step messages, wherein each of the step messages is assigned to one of the processing units managing one or more of the partitions of the subject table. One or more actions are identified for each of the step messages, and one or more necessary records for these actions are retrieved from the partition of the subject table and stored into a corresponding partition of a spool table. The necessary records are selected in such a manner that remaining actions involved in the request need to access the partition of the subject table. The remaining actions are then performed against the partitions of the spool table rather than the partitions of the subject table. An optimizer function uses information from the spool table to generate more efficient execution plans for the associated actions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for accessing a subject table in a computer system, comprising:

(a) partitioning the subject table across a plurality of processing units of the computer system, wherein each of the processing units manages at least one partition of the subject table;

(b) splitting a request to access the subject table into a pluality of step messages, wherein each of the step messages comprises one or more actions, each of the step messages is assigned to one of the processing units managing one or more of the partitions of the subject table, and at least some of the step messages can be performed simultaneously and in parallel by the processing units;

(c) retrieving one or more necessary records for the actions from the partition of the subject table and storing the retrieved necessary records into a corresponding partition of a spool table, wherein the necessary records are selected in such a manner such that only one of the actions involved in the request needs to access the partition of the subject table; and (d) performing remaining ones of the actions against the corresponding partition of the spool table rather than the partition of the subject table.

2. The method of claim 1, wherein the necessary records are selected in such a manner that none of the remaining actions in the request need to access the partition of the subject table.

3. The method of claim 1, wherein an optimizer function uses information from the spool table to generate more efficient execution plans for the request and its actions.

4. The method of claim 1, wherein the partitions are selected from a group of partitions comprising range partitions, hash partitions, and no partitions.

5. An apparatus for accessing a subject table in a computer system, wherein the table has a plurality of partitions, comprising:

(a) a computer system having a plurality of processing units, each with zero or more data storage devices coupled thereto, wherein the data storage devices store at least one store table;

(b) logic, performed by the computer system, for:
  (1) partitioning the subject table across a plug of processing units of the computer system, wherein each of the processing units manages at least one partition of the subject table;
  (2) splitting a request to access the subject table into a plurality of step messages, wherein each of the step messages comprises one or more actions, each of the step messages is assigned to one of the processing units managing one or more of the partitions of the subject table, and at least some of the step messages can be performed simultaneously and in parallel by the processing units;
  (3) receiving one or more necessary records for the actions from the partition of the subject table and storing the retrieved necessary records into a corresponding partition of a spool table, wherein the necessary records are selected in such a manner such that only one of the actions involved in the request needs to access the partition of the subject table; and
  (4) performing remaining ones of the actions against the corresponding partition of the spool table rather than the partition of the subject table.

6. The apparatus of claim 5, wherein the necessary records are selected in such a manner that none of the remaining actions in the request need to access the partition of the subject table.

7. The apparatus of claim 5, wherein an optimizer function uses information from the spool table to generate more efficient execution plans for the request and its actions.

8. The apparatus of claim 5, wherein the partitions are selected from a group of partitions comprising range partitions, hash partitions, and no partitions.

9. An article of manufacture embodying logic for accessing a subject table in a computer system, the logic comprising:

(a) partitioning the subject table across a plurality of processing units of the computer system, wherein each of the processing units manages at least one partition of the subject table;

(b) splitting a request to access the subject table into a plurality of step messages, wherein each of the step messages comprises one or more actions, each of the step messages is assigned to one of the processing units one or more of the partitions of the subject table, and at least some of the step messages can be performed simultaneously and in parallel by the processing units;

(c) retrieving one or more necessary records for the actions from the partition of the subject table and storing the retrieved necessary records into a corresponding partition of a spool table, wherein the necessary records are selected in such a manner such that only one of the actions involved in the request needs to access the partition of the subject table; and (d) performing ring ones of the actions against the corresponding partition of the spool table rather than the partition of the subject able.

10. The method of claim 9, wherein the necessary records are selected in such a manner that none of the remaining actions in the request need to access the partition of the subject table.

11. The method of claim 9, wherein an optimizer function uses information from the spool table to generate more efficient execution plans for the request and its actions.

12. The method of claim 9, wherein the partitions are selected from a group of partitions comprising range partitions, hash partitions, and no partitions.

* * * * *

UNITED STATES PATENT AND TRADEMARK OFFICE
CERTIFICATE OF CORRECTION

PATENT NO.    : 6,470,331 B1
DATED         : October 22, 2002
INVENTOR(S)   : James Chen et al.

It is certified that error appears in the above-identified patent and that said Letters Patent is hereby corrected as shown below:

Column 7,
Line 27, after "a" delete "plug" and insert -- plurality --
Line 39, after "(3)" delete "receiving" and insert -- retrieving --

Column 8,
Line 32, after "performing" delete "ring" and insert -- remaining --

Signed and Sealed this

First Day of March, 2005

JON W. DUDAS
*Director of the United States Patent and Trademark Office*